J. N. DECKER.
Vehicle Spring.

No. 113,270. Patented April 4, 1871.

Witnesses:
H. D. Peck
C. L. Fisher

Inventor.
John N. Decker

United States Patent Office.

JOHN N. DECKER, OF COVINGTON, KENTUCKY, ASSIGNOR TO HIMSELF AND THOMAS J. SMITH, OF SAME PLACE.

Letters Patent No. 113,270, dated April 4, 1871; antedated March 21, 1871.

IMPROVEMENT IN SPRINGS FOR VEHICLES.

The Schedule referred to in these Letters Patent and making part of the same.

I, JOHN N. DECKER, of Covington, in the county of Kenton and State of Kentucky, have invented an Improved Adjustable Auxiliary Spring for Carriages, Wagons, and other Vehicles, of which the following is a specification.

My invention relates to a spring made of bar-steel or iron, or other suitable material, bent in a V or other shape, adjustable between and secured at its ends to the upper and lower sections of an ordinary buggy, wagon, carriage, or coach-spring.

Figure 1:
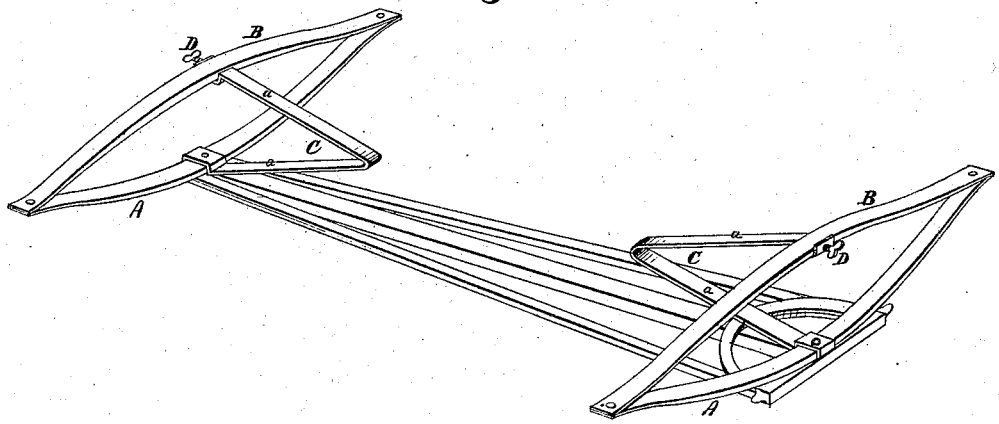
Figure 1 represents in perspective a part of the frame of a carriage, exhibiting the application of my improved spring.
Figure 2:
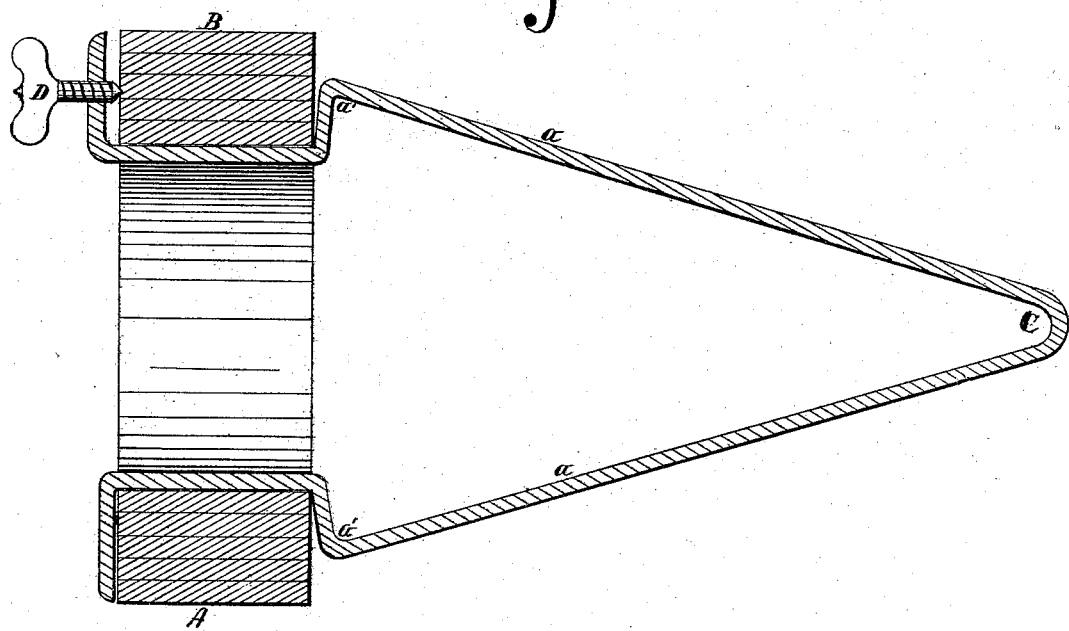
Figure 2 is a longitudinal section of my improved auxiliary spring and carriage-spring, showing the relative position and manner of connecting the two.

A is the lower section of a carriage or wagon-spring secured to the frame of vehicle.

B is the upper section of said spring, upon which the body of the vehicle rests.

The adjustable auxiliary spring C is constructed, preferably, of flat bar-steel formed in the shape of the letter V.

The ends of the spring are bent toward each other, nearly at right angles to the arms $a$ of the spring.

At a distance from the first-made angle $a'$ equal to, or nearly so, the thickness of the carriage-spring, a second angle is made in the ends of the auxiliary spring about equal to the angle $a'$.

The ends of the spring trend in a direction opposite to the main arms $a$ of the spring, and are turned up near their extreme end in a direction parallel to the carriage-spring, to which they are attached by thumb-screws D.

The boxed ends of the auxiliary spring are pressed together and entered between the upper and lower sections of the carriage or wagon-spring; then, being freed, the ends spring apart and engage the two sections of the carriage-spring. The thumb-screw or screws are impinged upon the carriage-spring, thereby connecting the two springs together.

The herein-described auxiliary spring is designed for use in vehicles that may be overloaded or traverse rough ways, in order to lessen the strain upon the main spring, which, under sudden strains, is liable to be injured or broken.

In case the wagon or carriage is, from the nature of the load, weighted more upon one side than the other, the auxiliary spring may be moved from its central position and attached in such a manner as to receive the excessive side weight, and thus insure a uniform strain upon the main spring of the vehicle.

I claim as my invention—

The hereinabove-described adjustable auxiliary spring, when the same is constructed substantially in the manner and for the purpose shown and described.

JNO. N. DECKER.

Witnesses:
  H. D. PECK,
  O. L. FISHER.